Patented Nov. 25, 1924.

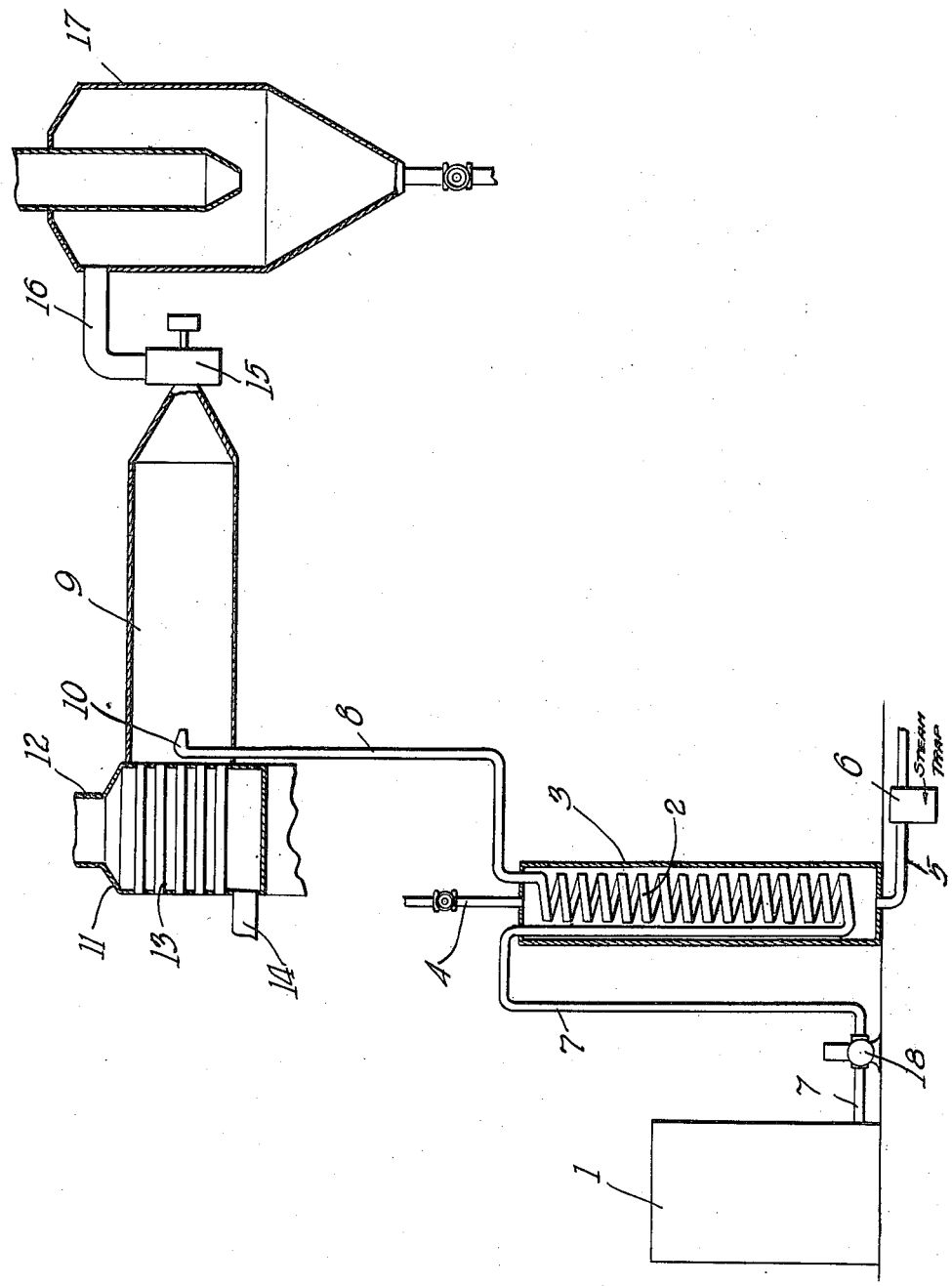

1,516,512

UNITED STATES PATENT OFFICE.

RICHARD W. G. STUTZKE, OF CEDAR RAPIDS, IOWA, ASSIGNOR TO DOUGLAS COMPANY, OF CEDAR RAPIDS, IOWA, A CORPORATION OF DELAWARE.

MANUFACTURE OF PRODUCTS FROM STARCH.

Application filed November 8, 1918. Serial No. 261,751.

*To all whom it may concern:*

Be it known that I, RICHARD W. G. STUTZKE, a native of Germany, having made my declaration of intention to become a citizen of the United States, but not having as yet been naturalized, residing at Cedar Rapids, in the county of Linn and State of Iowa, have invented certain new and useful Improvements in the Manufacture of Products from Starch, of which the following is a specification.

My invention relates to the manufacture of products from starch, more especially corn starch, such, for example, as thin boiling starch, soluble starch, British gum, and other products resulting from the modification or hydrolysis of starch, the term "modification" being used herein to include hydrolysis of the starch to any stage, and the principal objects of the invention are: to simplify and minimize the cost of modifying starch and reducing the product to a dry state; to provide a novel method of modifying the starch and drying the product in a single, continuous operation; and to provide a method whereby the starch may be modified without the use of an acid or other catalyzing agent. The method which I have invented may be employed to advantage with acidified starch as well as with starch containing no acid. But for certain products it is a distinct advantage not to employ the usual acid or catalyzing agent. In such case the cost of the acid is saved, the inconvenience and expense of subsequently neutralizing the product is avoided, and a neutral product is obtained which is free from the traces of salt contained in an acid modified and neutralized product. Moreover, in the manufacture of a neutral, modified product this feature of my invention is of considerable advantage in connection with and as incident to the continuous modifying and drying of the starch as contemplated by the invention. After the product has been reduced to a dry state neutralization by ordinary means is obviously impractical, and the interruption of the process, between the modifying and drying operations, would involve manifest disadvantages and difficulties.

In the accompanying drawing I have shown diagrammatically, partly in section and partly in elevation, an apparatus suitable for practicing the process of my invention.

In this drawing, 1 represents a vat or container for the starch liquor to be treated. 2 is a pipe coil of considerable length and relatively small diameter. For example, it may consist of one hundred feet of one-half inch pipe. The coil is arranged in a closed vessel 3 which is supplied with steam through pipe 4. By the term "pipe coil" as used in the claims I intend any duct through which the starch liquor to be modified will pass in a stream so small in diameter relative to its length that in passing through the coil it will be heated to substantially the temperature of the steam in vessel 3. 5 is a pipe for carrying off water of condensation from vessel 3 provided preferably with an automatic steam trap 6. A pipe 7 leads from the vat 1 to one end of the coil 2. A pipe 8 extends from the other end of the coil into a drying chamber 9, the pipe 8 being provided preferably with a spray nozzle 10 or other device for dispersing the liquid in the drying chamber, when it is desired that the converted liquor be dried continuously as modified and by spraying. The means for drying the liquid and separating the dry product from the air many consist of any suitable spray desiccation apparatus. I have shown, for illustration, an arrangement whereby air may be introduced into the drying chamber after being heated by means of exhaust furnace gases. The air might be heated in any other manner, and it will be possible not to introduce air into the drying chamber, provided the product will stand relatively high temperatures. 11 is an air heating chamber provided with a stack 12 and with air tubes 13, the opposite ends of which are open to the atmosphere and the drying chamber, respectively. 14 is a pipe by which the exhaust gases are introduced into the heating chamber below the air tubes. Circulation through the drying chamber is brought about by means of a fan 15, the eduction pipe 16 of which leads to a cyclone dust collector 17, or other suitable dust collecting device. 18 is a pump in pipe 7.

The process of my invention is not to be understood as limited to the employment of the particular apparatus just described. Having reference to the apparatus as shown, the operation of modifying and drying the starch is carried out as follows:

The starch, mixed with water sufficient to make the material fluent, for example, at a density of 12 Baumé, is forced by pump 18 from vat 1 through the coil 2 and from coil 2 to the spray nozzle 10 which sprays the liquor in the drying chamber 9. Steam is maintained in the vessel 3 at a pressure sufficient to give the temperature necessary for modifying the starch to the extent required. The pump 18 maintains the liquor in the coil at a pressure high enough to prevent appreciable vaporization, so that the material delivered to the nozzle is in the form of a liquid. The modification of the starch takes place, to a very large extent at least, in the coil 2. The drying operation is preferably carried on at a relatively low temperature so as to prevent discoloration of the product, and in consequence there will be little or no modification of the starch at this stage. However, by increasing the heat of the drying air it is possible to obtain, if desired, some further modification of the starch while it is being dried. The dried material, in the form of a powder, together with the air and vapors are drawn out of the drying chamber by the fan 15 and the separation between the dry product, on the one hand, and the air and vapor, on the other, is effected in the dust collector 17.

It is possible to obtain a considerable modification of the starch without the use of any acid or other catalyzer, but to obtain a product having a high percentage of solubility it may be desirable to acidify the starch before treatment, in which case the product will be somewhat acid; although a certain amount, at least, of the acid will be evaporated during the drying operation. For the manufacture of certain products it is desirable to first modify the starch in the usual way and then subject it to treatment in the manner above described. In this way a product may be obtained, a large proportion of which will be soluble in cold water.

To illustrate the adaptability of the method of my invention to the manufacture of products having different characteristics, I will give certain typical examples as follows:

*Example No. 1.*—Starch 10 Baumé without acid or other catalyzer was forced through the coil into the drying chamber at one thousand pounds pressure. Steam was maintained in the vessel 3 at a pressure of thirty-five pounds. The temperature of the air introduced into the drying chamber was approximately 250° Fahrenheit reduced to approximately 204° at the place of evaporation. The product was a British gum 14.82% soluble in cold water, approximately 60° Fahrenheit.

*Example No. 2.*—The same conditions were maintained as Example No. 1, except that the coil was heated by steam at 110 pounds pressure. The product had a solubility of 43.9%.

*Example No. 3.*—280 pounds of starch was first treated for two and a half hours with nascent chlorine produced by introducing into the starch a mixture of nitric acid and hydrochloric acid. Following this treatment the starch was forced through the coil under 1000 pounds pressure. Steam was maintained in the vessel 3 at 90 pounds pressure. The product was a modified starch 58.9% soluble in cold water.

*Example No. 4.*—The starch was first modified in the ordinary way so as to have a fluidity of 90° measured on the ordinary fluidity scale. It was then introduced into the coil under 1000 pounds pressure and steam maintained in the steam chamber at 100 pounds pressure. The product was 75% soluble in cold water.

All of the above products on test showed the starch reaction. In all of the examples given pressures in the coil were probably higher than necessary. The excessively high pressures were used in order to insure against possibility of vaporizing the liquid under treatment.

I claim:

1. The method of modifying starch which consists in forcing a stream of starch mixed with an aqueous liquid through a pipe coil and through a spraying orifice at the extremity thereof into a drying atmosphere, and maintaining a temperature around said coil and a pressure therein which modify the starch in the coil and before issuing therefrom.

2. The method of modifying starch which consists in forcing a stream of starch mixed with an aqueous liquid through a pipe coil and through a spraying orifice at the extremity thereof into a drying atmosphere, and maintaining a temperature around said coil which heats the starch liquor therein above the boiling point and a pressure in the coil which prevents the vaporization of said liquor in the coil to modify the starch in the coil and before it issues therefrom.

3. The method of modifying starch which consists in forcing a stream of starch mixed with an aqueous liquid but without acid or other catalyzer through a pipe coil and maintaining a temperature around said coil and a pressure therein which modify the starch.

4. The method of modifying starch which consists in forcing a stream of starch mixed with an aqueous liquid but without acid or other catalyzer through a pipe coil and maintaining a temperature around said coil and a pressure therein which modify the starch, and injecting the modified starch liquor as it issues from the pipe coil in a dispersed state into a drying atmosphere.

5. The method of modifying starch which consists in forcing a stream of starch mixed with an aqueous liquid but without acid or other catalyzer through a pipe coil and through a spraying orifice at the extremity thereof into a drying atmosphere, and maintaining a temperature, above the boiling point of the starch liquor, around said coil and a pressure in the coil preventing vaporization therein which modify the starch in the coil and before it issues therefrom.

6. The method of hydrolyzing starch which consists in forcing a stream of starch mixed with an aqueous liquid through a pipe coil and through a spraying orifice at the extremity thereof into a drying atmosphere, and maintaining a temperature around said coil above the boiling point of the starch liquor and a pressure in the coil preventing vaporization of said liquor therein which brings about an hydrolysis of the starch prior to its delivery from the spraying orifice.

7. The method of hydrolyzing starch which consists in forcing a stream of starch mixed with an aqueous liquid through a pipe coil, and maintaining a temperature around said coil and a pressure therein which bring about the hydrolysis of the starch.

RICHARD W. G. STUTZKE.